United States Patent [19]

Hayashi

[11] Patent Number: 5,652,670

[45] Date of Patent: Jul. 29, 1997

[54] SCANNING IMAGE FORMING LENS AND OPTICAL SCANNER

[75] Inventor: Yoshinori Hayashi, Kawasaki, Japan

[73] Assignee: Ricoh Company, Ltd., Tokyo, Japan

[21] Appl. No.: 598,705

[22] Filed: Feb. 8, 1996

[30] Foreign Application Priority Data

Mar. 1, 1995 [JP] Japan ................................ 7-041927

[51] Int. Cl.$^6$ ........................................ G02B 26/08
[52] U.S. Cl. .................. 359/205; 359/206; 359/212; 359/216; 359/217; 359/662; 359/717
[58] Field of Search ......................... 359/205–207, 359/216–219, 662, 717, 793–795; 347/258–259

[56] References Cited

U.S. PATENT DOCUMENTS 5,488,502  1/1996  Saito ........................................ 359/205

FOREIGN PATENT DOCUMENTS 1-92715  4/1989  Japan .

*Primary Examiner*—James Phan
*Attorney, Agent, or Firm*—Oblon, Spivak, McClelland, Maier & Neustadt, P.C.

[57] ABSTRACT

In a scanning image forming lens used in an optical scanner, a light beam from a laser light source is coupled and deflected at an equal angular velocity by an optical deflector and is converged as a light spot on a scanned face by the scanning image forming lens to optically scan the scanned face at an equal speed. The scanning image forming lens is constructed by first and second plastic lenses such that the first lens is constructed by a positive meniscus lens having a concave face directed onto an optical deflector side. The second lens is arranged near a scanned face side of the first lens. At least one face of each of the first and second lenses is constructed by an aspherical surface. $|\theta_1/\theta_2|$ has a local minimum near an optical axis of the scanning image forming lens and is increased from the optical axis toward a peripheral portion of the scanning image forming lens when $\theta_1$ is set to an acute angle between the optical axis and the light beam incident to the second lens and $\theta_2$ is set to an acute angle between the optical axis and the light beam emitted from the second lens.

3 Claims, 4 Drawing Sheets

FIELD ANGLE (DEGREE)

FIELD ANGLE 43° fθ CHARACTERISTICS

FIELD ANGLE 43°

CROSS SCAN
MAIN SCAN

FIELD CURVATURE

FIELD ANGLE 43° fθ CHARACTERISTICS

FIELD ANGLE 43°

CROSS SCAN

MAIN SCAN

−4.00    4.00

FIELD CURVATURE $|\theta_1 / \theta_2|$

FIELD ANGLE 43°

FIELD CURVATURE

FIELD ANGLE 43° fθ CHARACTERISTICS

SCANNING IMAGE FORMING LENS AND OPTICAL SCANNER

BACKGROUND OF THE INVENTION

1. Field of the Invention

The present invention relates to a scanning image forming lens and an optical scanner using this scanning image forming lens.

2. Description of the Related Art

In an optical scanner, a light beam is deflected at an equal angular velocity and is converged as a light spot on a scanned face by a scanning image forming lens so that the scanned face is optically scanned. Various kinds of optical scanners are widely known in association with an optical printer, a digital copying machine, etc.

Recently, a reduction in cost of each of the optical printer and the digital copying machine has been required to spread the optical printer and the digital copying machine. Therefore, a reduction in cost of the optical scanner and compactness of the optical scanner are required.

In the optical scanner, a main portion of the cost of the optical scanner is occupied by a scanning image forming lens. Compactness of the scanning image forming lens is indispensable to the compactness of the optical scanner.

It is effective to construct the scanning image forming lens by a cheaper material and a smaller number of lenses to realize the reduction in cost of the scanning image forming lens and the compactness of the scanning image forming lens. For example, if the scanning image forming lens can be constructed by a single plastic lens, there are no problems in cost and compactness of the scanning image forming lens. However, it is difficult to really realize optical performance required for the scanning image forming lens by the single plastic lens.

Therefore, it is considered that the scanning image forming lens is constructed by two plastic lenses as the second best policy for the reduction in cost and compactness.

An fθ lens shown in Japanese Patent Application Laying Open (KOKAI) No. 1-92715 is an example in which the scanning image forming lens is constructed by such two plastic lenses.

This fθ lens is constructed by a biconvex lens and a lens having a toric face on an incident side and a spherical surface on an emitting side. The biconvex lens and the lens having the toric face are arranged in proximity to each other so that the fθ lens is compact.

The plastic lens can be manufactured in large quantities by injection molding so that manufacturing cost of the plastic lens can be reduced. It is preferable to uniform a shape of the plastic lens as much as possible so as to form a lens conforming to the shape of a die by the injection molding. Namely, the shape of the plastic lens is desirably formed such that there is no great change in thickness of the plastic lens.

In consideration of such a viewpoint, the fθ lens shown in the above laid open patent is constructed by a convex lens and a difference in lens thickness between central and peripheral portions of the convex lens is large. Inclining directions of both lens faces are opposed to each other. Therefore, it is difficult to accurately form the fθ lens as molded by injection molding.

Further, optical characteristics of the plastic lens tend to be changed by a change in temperature. However, this problem is not considered in the case of the above fθ lens.

SUMMARY OF THE INVENTION

It is therefore a first object of the present invention to provide a scanning image forming lens reduced in cost and made compact and not easily influenced by temperature, etc. and having preferable optical performance.

A second object of the present invention is to provide an optical scanner reduced in cost and made compact and not easily influenced by temperature, etc. and having preferable optical performance.

In accordance with a first construction of the present invention, the above first object can be achieved by a scanning image forming lens used in an optical scanner in which a light beam from a laser light source is coupled and deflected at an equal angular velocity by an optical deflector and is converged as a light spot on a scanned face by the scanning image forming lens to optically scan the scanned face at an equal speed;

the scanning image forming lens being constructed by two plastic lenses composed of first and second lenses such that the first lens is arranged on a side of the optical deflector and is constructed by a positive meniscus lens having a concave face directed onto the optical deflector side;

the second lens is arranged in the vicinity of a scanned face side of the first lens;

at least one face of each of the first and second lenses is constructed by an aspherical surface; and $|\theta_1/\theta_2|$ has a local minimum in the vicinity of an optical axis of the scanning image forming lens and is increased from the optical axis toward a peripheral portion of the scanning image forming lens when $\theta_1$ is set to an acute angle formed between the optical axis and the light beam incident to the second lens and $\theta_2$ is set to an acute angle formed between the optical axis and the light beam emitted from the second lens.

In accordance with a second construction of the present invention, the above first object can be also achieved by a scanning image forming lens used in an optical scanner in which a light beam from a laser light source is coupled and converged in a cross scan-corresponding direction and is formed as a linear image extending in a main scan-corresponding direction, the light beam is then deflected at an equal angular velocity by an optical deflector having a deflecting reflecting face in the vicinity of a forming position of the linear image; and the deflected light beam is converged as a light spot on a scanned face by the scanning image forming lens to optically scan the scanned face at an equal speed;

the scanning image forming lens being constructed by two plastic lenses composed of first and second lenses such that the scanning image forming lens has a function for approximately setting the scanned face and a starting point of deflection of the light beam on the deflecting reflecting face in a conjugate relation in geometrical optics with respect to the cross scan-corresponding direction;

the first lens is arranged on a side of the optical deflector and is constructed by a positive meniscus lens having a concave face directed onto the optical deflector side such that at least one face of the first lens is an aspherical surface;

the second lens is arranged in the vicinity of a scanned face side of the first lens such that the second lens has a barrel type toroidal face having an aspherical shape in the main scan-corresponding direction on an optical deflector side and has a normal toroidal face on a scanned face side: and $|\theta_1/\theta_2|$ has a local minimum in the vicinity of an optical axis of the scanning image forming lens and is increased from the optical axis toward a peripheral portion of the scanning image forming lens when $\theta_1$ is set to an acute angle formed between the optical axis and the light beam incident to the second lens and $\theta_2$ is set to an acute angle formed between the optical axis and the light beam emitted from the second lens.

In each of the first and second constructions of the present invention, the scanning image forming lens can be reduced in cost and can be made compact and is not easily influenced by temperature, etc. and has preferable optical performance.

In accordance with a fifth construction of the present invention, the above second object can be achieved by an optical scanner in which a light beam from a laser light source is coupled and deflected at an equal angular velocity by an optical deflector and is converged as a light spot on a scanned face by a scanning image forming lens to optically scan the scanned face at an equal speed;

the scanning image forming lens being constructed by two plastic lenses composed of first and second lenses such that the first lens is arranged on a side of the optical deflector and is constructed by a positive meniscus lens having a concave face directed onto the optical deflector side;

the second lens is arranged in the vicinity of a scanned face side of the first lens;

at least one face of each of the first and second lenses is constructed by an aspherical surface; and $|\theta_1/\theta_2|$ has a local minimum in the vicinity of an optical axis of the scanning image forming lens and is increased from the optical axis toward a peripheral portion of the scanning image forming lens when $\theta_1$ is set to an acute angle formed between the optical axis and the light beam incident to the second lens and $\theta_2$ is set to an acute angle formed between the optical axis and the light beam emitted from the second lens.

In accordance with a sixth construction of the present invention, the above second object can be also achieved by an optical scanner in which a light beam from a laser light source is coupled and converged in a cross scan-corresponding direction and is formed as a linear image extending in a main scan-corresponding direction;

the light beam is then deflected at an equal angular velocity by an optical deflector having a deflecting reflecting face in the vicinity of a forming position of the linear image: and the deflected light beam is converged as a light spot on a scanned face by a scanning image forming lens to optically scan the scanned face at an equal speed;

the scanning image forming lens being constructed by two plastic lenses composed of first and second lenses such that the scanning image forming lens has a function for approximately setting the scanned face and a starting point of deflection of the light beam on the deflecting reflecting face in a conjugate relation in geometrical optics with respect to the cross scan-corresponding direction;

the first lens is arranged on a side of the optical deflector and is constructed by a positive meniscus lens having a concave face directed onto the optical deflector side such that at least one face of the first lens is an aspherical surface;

the second lens is arranged in the vicinity of a scanned face side of the first lens such that the second lens has a barrel type toroidal face having an aspherical shape in the main scan-corresponding direction on an optical deflector side and has a normal toroidal face on a scanned face side; and $|\theta_1/\theta_2|$ has a local minimum in the vicinity of an optical axis of the scanning image forming lens and is increased from the optical axis toward a peripheral portion of the scanning image forming lens when $\theta_1$ is set to an acute angle formed between the optical axis and the light beam incident to the second lens and $\theta_2$ is set to an acute angle formed between the optical axis and the light beam emitted from the second lens.

In each of the fifth and sixth constructions of the present invention, the optical scanner can be reduced in cost and can be made compact and is not easily influenced by temperature, etc. and has preferable optical performance.

Further objects and advantages of the present invention will be apparent from the following description of the preferred embodiments of the present invention as illustrated in the accompanying drawings.

DESCRIPTION OF THE PREFERRED EMBODIMENTS

Figure 1A:
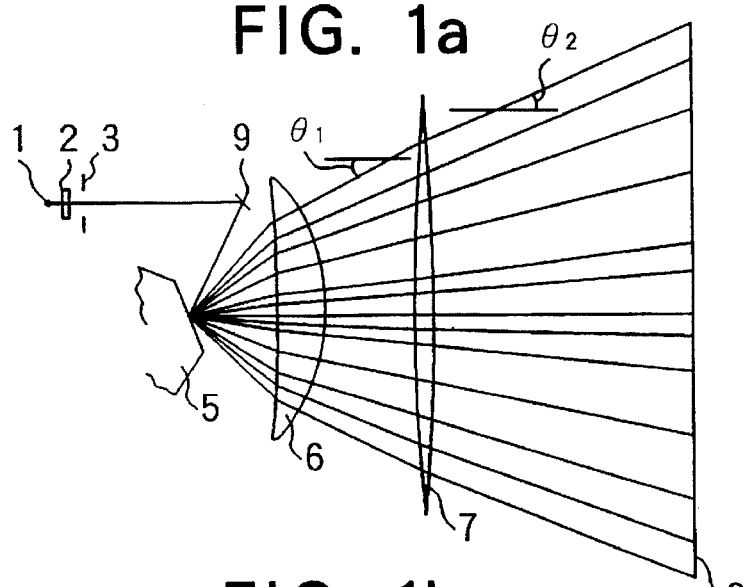
FIGS. 1a to 1e are views for explaining embodiments of an optical scanner having each of fifth and seventh constructions and a scanning image forming lens having a first construction.

The preferred embodiments of a scanning image forming lens and an optical scanner in the present invention will next be described in detail with reference to the accompanying drawings.

In the scanning image forming lens of a first construction of the present invention used in an optical scanner, a light beam from a laser light source is coupled and deflected at an equal angular velocity by an optical deflector and is converged as a light spot on a scanned face by the scanning image forming lens to optically scan the scanned face at an equal speed. This scanning image forming lens has the following features.

Namely, the scanning image forming lens is constructed by two plastic lenses composed of first and second lenses such that the first lens is arranged on a side of the optical deflector and is constructed by a positive meniscus lens having a concave face directed onto the optical deflector side. The second lens is arranged in the vicinity of a scanned face side of the first lens.

At least one face of each of the first and second lenses is constructed by an aspherical surface.

$|\theta_1/\theta_2|$ is changed in the shape of a monotonous concave curve having a local minimum in the vicinity of an optical axis of the scanning image forming lens when $\theta_1$ is set to an acute angle formed between the optical axis and the light beam incident to the second lens and $\theta_2$ is set to an acute angle formed between the optical axis and the light beam emitted from the second lens.

In the scanning image forming lens of a second construction of the present invention used in an optical scanner, a light beam from a laser light source is coupled and converged in a cross scan-corresponding direction and is formed as a linear image extending in a main scan-corresponding direction. The light beam is then deflected at an equal angular velocity by an optical deflector having a deflecting reflecting face in the vicinity of a forming position of the linear image. The deflected light beam is converged as a light spot on a scanned face by the scanning image forming lens to optically scan the scanned face at an equal speed. This scanning image forming lens has the following features.

Namely, the scanning image forming lens is constructed by two plastic lenses composed of first and second lenses. The scanning image forming lens has a function for approximately setting the scanned face and a starting point of deflection of the light beam on the deflecting reflecting face in a conjugate relation in geometrical optics with respect to the cross scan-corresponding direction.

The above cross scan-corresponding direction is set to a direction parallel to a cross scanning direction and corresponding to this cross scanning direction on a virtual optical path provided by linearly developing an optical path from the light source to the scanned face along the optical axis of an optical axis. The main scan-corresponding direction is set to a direction parallel to a main scanning direction and corresponding to this main scanning direction on this virtual optical path.

The first lens is arranged on a side of the optical deflector and is constructed by a positive meniscus lens having a concave face directed onto the optical deflector side such that at least one face of the first lens is an aspherical surface.

The second lens is arranged in the vicinity of a scanned face side of the first lens such that the second lens has a barrel type toroidal face having an aspherical shape in the main scan-corresponding direction on an optical deflector side and has a normal toroidal face on a scanned face side.

$|\theta_1/\theta_2|$ is changed in the shape of a monotonous concave curve having a local minimum in the vicinity of an optical axis of the scanning image forming lens when $\theta_1$ is set to an acute angle formed between the optical axis and the light beam incident to the second lens and $\theta_2$ is set to an acute angle formed between the optical axis and the light beam emitted from the second lens.

In accordance with a third construction of the present invention, the following condition $$0.95 < m(H)/m(O) < 1.05 \tag{1}$$

is satisfied in the second construction when magnification in the conjugate relation in the cross scan-corresponding direction is set to m(O) on the optical axis and m(H) at the height of a most peripheral image.

In accordance with a fourth construction of the present invention, the magnification m(O) on the optical axis in the conjugate relation in the cross scan-corresponding direction satisfies the following condition in the second or third construction.

$$m(O) > 0.59 \tag{2}$$

In an optical scanner having a fifth construction of the present invention, a light beam from a laser light source is coupled and deflected at an equal angular velocity by an optical deflector and is converged as a light spot on a scanned face by a scanning image forming lens to optically scan the scanned face at an equal speed. The scanning image forming lens has the above first construction.

In an optical scanner having a sixth construction of the present invention, a light beam from a laser light source is coupled and converged in a cross scan-corresponding direction and is formed as a linear image extending in a main scan-corresponding direction. The light beam is then deflected at an equal angular velocity by an optical deflector having a deflecting reflecting face in the vicinity of a forming position of the linear image. The deflected light beam is converged as a light spot on a scanned face by a scanning image forming lens to optically scan the scanned face at an equal speed. The scanning image forming lens has the above second, third or fourth construction.

In the optical scanner having each of the fifth and sixth constructions, the light beam from the laser light source may be changed to a convergent or divergent light beam by the coupling lens. Otherwise, the light beam from the laser light source may be changed to a parallel light beam by the coupling lens as in the seventh construction of the optical scanner.

When the light beam from the laser light source is changed to a parallel light beam by the coupling lens, the scanning image forming lens in each of the first to fourth constructions is an fθ lens.

The optical deflector in the optical scanner having each of the fifth to seventh constructions can be constructed by using a rotary polygon mirror, a rotary two-face mirror, a rotary unifacial mirror, a pyramidal mirror, etc.

In the scanning image forming lens of the present invention, the first lens is constructed by a meniscus lens and preferably has a uniform thickness although the lens thickness becomes a problem in plastic molding. Accordingly, a lens shape conforming to the shape of a die can be realized by molding.

When the scanning image forming lens is constructed by only a positive meniscus lens having a concave face directed onto the side of an optical deflector, negative distortional aberration required to provide an equal moving speed of the light spot on the scanned face formed by the deflected light beam deflected at an equal angular velocity is generally insufficient so that the height of an image of the light spot is increased. Accordingly, the moving speed of the light spot tends to be increased as the light spot approaches a peripheral portion of a main scanning region.

When the scanning image forming lens is constructed by an fθ lens, these contents mean that fθ characteristics are increased in a positive direction as the image height is increased.

In the present invention, the first lens is constructed by a positive meniscus lens having a concave face directed onto the optical deflector side. In this construction, the moving speed of the above light spot tends to be increased in the peripheral portion of the main scanning region. This tendency is corrected by the second lens.

Namely, when $\theta_1$ is set to an acute angle formed between the optical axis and a light beam incident to the second lens and $\theta_2$ is set to an acute angle formed between the optical axis and a light beam emitted from the second lens, $|\theta_1/\theta_2|$ is set to be increased as the light beam is emitted toward a peripheral portion of the main scanning region. This means that the light beam (having the angle $\theta_1$ with respect to the optical axis) in a direction separated from the optical axis tends to be bent by the second lens on a side approaching the optical axis in the peripheral portion of the main scanning region. Namely, this means that the angle $\theta_2$ becomes smaller than the angle $\theta_1$.

Accordingly, distortional aberration tending to be insufficient with respect to the first lens is compensated by the second lens so that an equal moving speed of the light spot is secured.

In the present invention, each of the first and second lenses is formed by plastic. Therefore, each of the first and second lenses is influenced by temperature. It is preferable to cancel the influences of temperature on the first and second lenses so as to effectively reduce a shift in image forming position in a main scanning direction in an optical axis direction caused by the influences of temperature.

The first lens is constructed by a positive lens. The second lens is constructed as mentioned above such that $|\theta_1/\theta_2|$ is increased as the light beam is emitted toward the peripheral portion of the main scanning region. Accordingly, the second lens functions as a positive lens in a region having a large incident angle. However, when the second lens is constructed by a positive lens at an entire incident angle, no influences of temperature on the first and second lenses are canceled.

A function of a negative lens is provided to the second lens in the vicinity of the optical axis. In such a construction, a region for forming $\theta_2 < \theta_2$ is provided in the vicinity of the optical axis.

Accordingly, $|\theta_1/\theta_2|$ is changed in the shape of a monotonous concave curve having a local minimum in the vicinity of the optical axis in a condition for effectively reducing the shift in image forming position in the main scanning direction in the optical axis direction caused by the influences of temperature while an equal speed of the optical scanning operation is secured.

Further, it is preferable to preferably perform the optical scanning operation that no diameter of the light spot in a cross scanning direction is greatly varied in the main scanning region. In particular, when a dot density in the optical scanning operation is equal to or greater than 600 dpi, it is desirable that a variation width of the spot diameter in the cross scanning direction caused in accordance with an image height of the light spot is within 5%.

The condition (1) is a condition for setting the variation width of the spot diameter in the cross scanning direction caused in accordance with the image height of the light spot to be within 5%.

When magnification exceeds its lower limit in the condition (2), the second lens approaches the scanned face so that it is difficult to make the scanning image forming lens compact. Further, a focal depth of the scanning image forming lens becomes shallow so that the spot diameter is excessively varied by defocus.

With respect to the scanning image forming lens in each of the first to fourth constructions, field curvature can be preferably corrected by optimizing an aspherical surface used in each of the first and second lenses.

Concrete embodiments of the present invention will next be explained.

FIGS. 1a to 1e are views for explaining embodiments of an optical scanner having each of fifth and seventh constructions and a scanning image forming lens having a first construction.

In FIG. 1a, a divergent light beam is emitted from a semiconductor laser 1 having an oscillating wavelength 780 nm as a laser light source. This light beam is coupled and changed to a parallel light beam by a coupling lens 2 in accordance with a seventh construction. A peripheral portion of the light beam is interrupted by an aperture 3. Thereafter, an optical path of the light beam is bent by a reflecting mirror 9. The light beam is then incident to a rotary polygon mirror 5 as an optical deflector. The light beam is deflected at an equal angular velocity in accordance with an equal speed rotation of the rotary polygon mirror 5.

The deflected light beam is sequentially transmitted through a first lens 6 and a second lens 7 constituting a scanning image forming lens. The light beam is then converged as a light spot on a scanned face 8 so that the scanned face 8 is optically scanned.

The deflected light beam is incident to the scanning image forming lens as a parallel light beam. In this case, the scanning image forming lens is an f$\theta$ lens and an equal scanning speed property of the scanning image forming lens is evaluated by f$\theta$ characteristics.

Each of the first and second lenses 6 and 7 is formed by a plastic material using injection molding. The plastic material has a refractive index 1.5721 with respect to the above oscillating wavelength 780 nm.

The first lens 6 is constructed by a positive meniscus lens having a concave face directed to the rotary polygon mirror 5. The first lens 6 has a spherical surface on a side of the rotary polygon mirror 5 and has a coaxial aspherical surface on a side of the scanned face 8. The second lens 7 has a coaxial aspherical surface on a side of the rotary polygon mirror 5 and has a spherical surface on a side of the scanned face 8.

In the following description, an X-coordinate is set to an optical axis direction and a Y-coordinate is set to a direction perpendicular to the optical axis. Further, R is set to a radius of curvature of the coaxial aspherical surface on the optical axis and K is set to a conical constant. A, B, C and D are set to aspherical coefficients of higher orders. In this case, the coaxial aspherical surface is a curved surface obtained by rotating a curve represented by the following formula around the optical axis.

$$X = (1/R)Y^2/[1+\sqrt{1-(1+K)(Y/R)^2}]+A\cdot Y^4+B\cdot Y^6+C\cdot Y^8+D\cdot Y^{10}$$

The coaxial aspherical surface is specified by R, K, A, B, C and D.

Concrete examples of the scanning image forming lens will next be explained.

In the following description, $S_0$ is set to a distance between a starting point of deflection on a deflecting reflecting face of the rotary polygon mirror 5 and an incident side face of the first lens 6. $d_1$ is set to a thickness of the first lens 6 on the optical axis. $l_1$ is set to a clearance on the optical axis between an emitting side face of the first lens 6 and an incident side face of the second lens 7. $d_2$ is set to a thickness of the second lens 7 on the optical axis. $l_2$ is set to a clearance on the optical axis between an emitting side face of the second lens and the scanned face 8. $R_1$ is set to a radius of curvature of the incident side face of the first lens 6. $R_2$ is set to a radius of curvature of the emitting side face of the first lens 6 on the optical axis. $R_3$ is set to a radius of curvature of the incident side face of the second lens 7 on the optical axis. $R_4$ is set to a radius of curvature of the emitting side face of the second lens 7.

Concrete example 1

| | |
|---|---|
| $S_0 = 44.2$ | |
| $R_1 = -478$ | $d_1 = 20$ |
| $R_2 = -69.5$ | $l_1 = 41.1$ |
| $R_3 = -630$ | $d_2 = 4.2$ |
| $R_4 = -700$ | $l_2 = 99.3$ |

Numeric values of K, A, B, C and D with respect to an aspherical surface are provided as follows.

Emitting side face of the first lens 6:

K=−0.551, A=5.277×10⁻⁸, B=−1.533×10⁻¹², C=−4.06× 10⁻¹⁵, D=−1.05×10⁻¹⁸

Incident side face of the second lens 7:

K=15, A=1.81×10⁻⁷, B=−1.58×10⁻¹¹, C=1.069×10⁻¹⁵, D=−5.44×10⁻²⁰

Figure 1B:
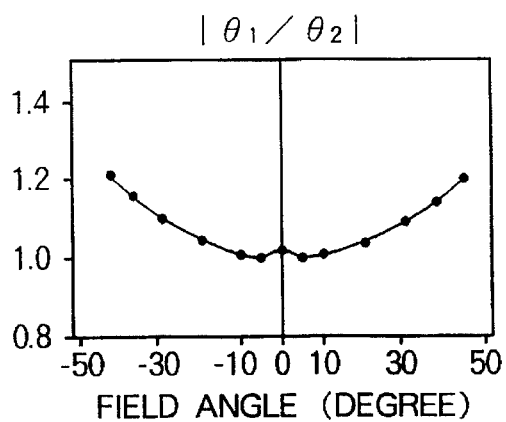
Figure 1C:
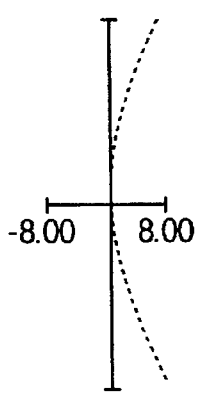

When the scanning image forming lens is constructed by only the first lens 6, fθ characteristics are provided as shown in FIG. 1c. As shown in FIG. 1c, fθ characteristics are reduced as a field angle is increased. Namely, fθ characteristics are reduced since the fθ characteristics are increased in a positive direction as the light spot approaches a peripheral portion of the main scanning region.

As shown in FIG. 1a, $\theta_1$ is set to an acute angle formed between a light beam incident to the second lens 7 and the optical axis. $\theta_2$ is set to an acute angle formed between a light beam emitted from the second lens 7 and the optical axis. As shown in FIG. 1b, $|\theta_1/\theta_2|$ is changed in the shape of a monotonous concave curve having a local minimum in the vicinity of the optical axis.

Figure 1D:
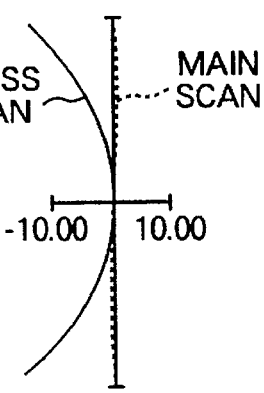
Figure 1E:
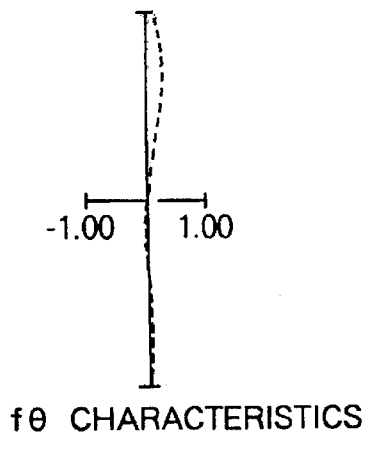

Since the second lens 7 has such characteristics, the fθ characteristics of the scanning image forming lens constructed by the first and second lenses 6, 7 are extremely preferably corrected as shown in FIG. 1e.

Further, as shown in FIG. 1d, field curvature in a main scanning direction is extremely preferably corrected by optimizing the aspherical surface used in each of the first and second lenses 6 and 7.

Concrete example 2

|  |  |
|---|---|
| $S_0$ = 38.85 | |
| $R_1$ = −422.5 | $d_1$ = 19.1 |
| $R_2$ = −68.15 | $l_1$ = 38 |
| $R_3$ = −750 | $d_2$ = 5.0 |
| $R_4$ = −850 | $l_2$ = 101 |

Numeric values of K, A, B, C and D with respect to the aspherical surface are provided as follows.

Emitting side face of the first lens 6:

K=−0.056, A=2.36×10⁻⁷, B=9.011×10⁻¹¹, C=−2.746×10⁻¹⁴, D=6.357×10⁻¹⁹

Incident side face of the second lens 7:

K=−20, A=1.9475×10⁻⁷, B=−1.3926×10⁻¹¹, C=5.486× 10⁻¹⁴, D=−8.956×10⁻²¹

Figure 2A:
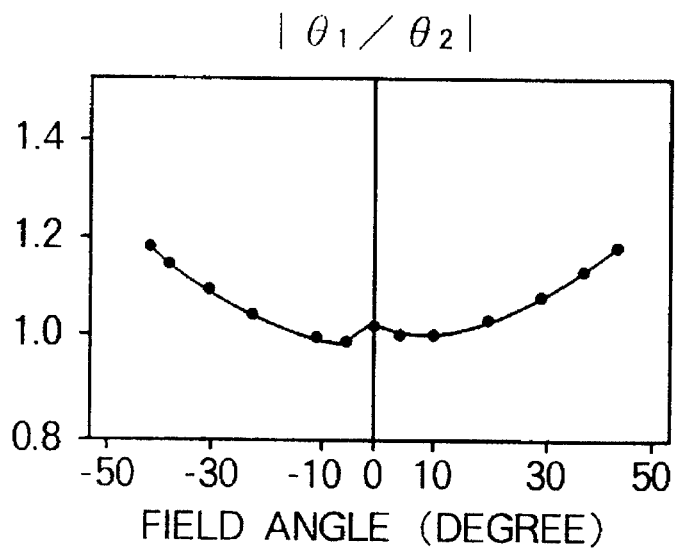
FIGS. 2a to 2c are views for explaining a concrete example 2.
Figures 2B, 2C:
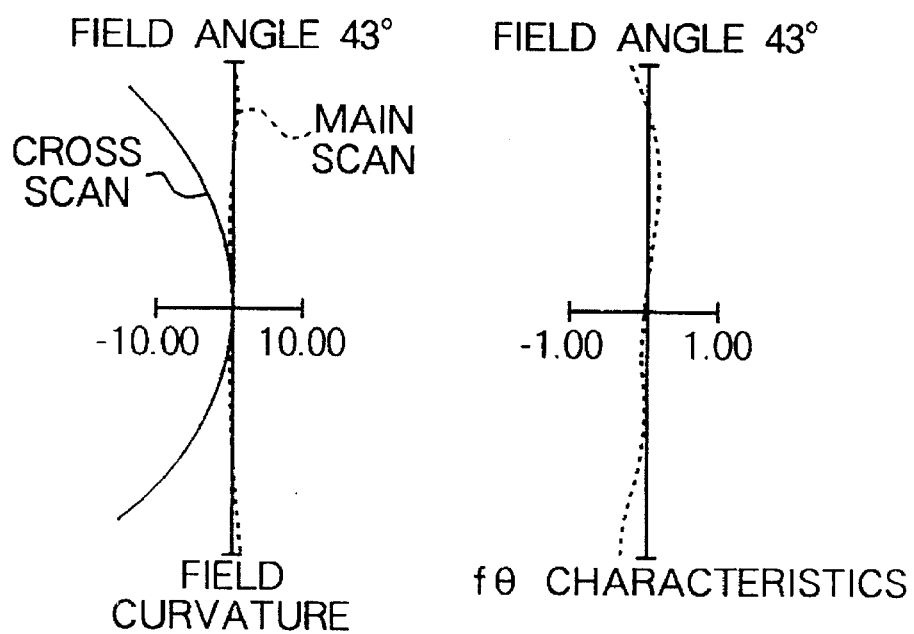

As shown in FIG. 2a, $|\theta_1/\theta_2|$ with respect to the second lens 7 is changed in the shape of a monotonous concave curve having a local minimum in the vicinity of the optical axis. fθ characteristics are extremely preferably corrected as shown in FIG. 2c.

As shown in FIG. 2b, field curvature in the main scanning direction is extremely preferably corrected by optimizing the aspherical surface used in each of the first and second lenses 6 and 7.

Figure 3A:
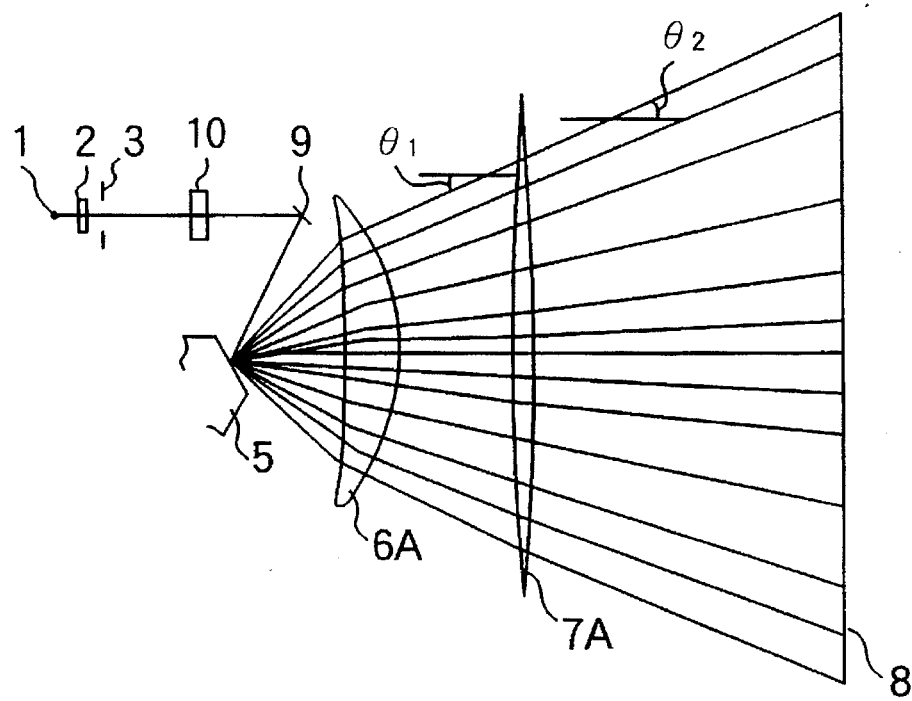
FIGS. 3a and 3b are views for explaining embodiments of an optical scanner having each of sixth and seventh constructions and a scanning image forming lens having each of second, third and fourth constructions.
Figure 3B:
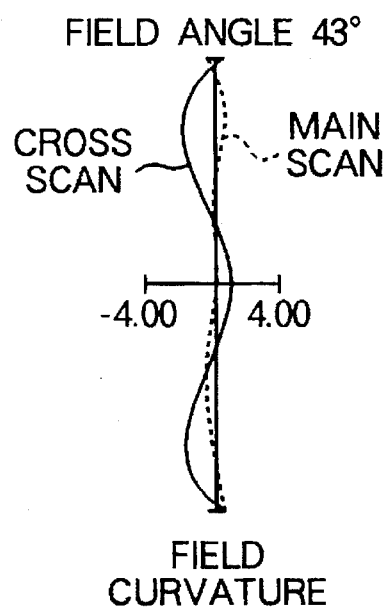

FIGS. 3a and 3b are views for explaining embodiments of an optical scanner having each of sixth and seventh constructions and a scanning image forming lens having each of second, third and fourth constructions. For brevity, constructional portions similar to those in FIG. 1a are designated by the same reference numerals.

In FIG. 3a, a divergent light beam is emitted from a semiconductor laser 1 having an oscillating wavelength 780 nm as a laser light source. This light beam is coupled and changed to a parallel light beam by a coupling lens 2 in accordance with the seventh construction. A peripheral portion of the light beam is interrupted by an aperture 3. Thereafter, an optical path of the light beam is bent by a reflecting mirror 9 while the light beam is converged in a cross scan-corresponding direction by a cylindrical lens 10 having positive refracting power in the cross scan-corresponding direction. The light beam is then formed as a linear image extending in a main scan-corresponding direction in the vicinity of a deflecting reflecting face of the rotary polygon mirror 5. The light beam is deflected at an equal angular velocity in accordance with an equal speed rotation of the rotary polygon mirror 5.

The deflected light beam is sequentially transmitted through a first lens 6A and a second lens 7A constituting a scanning image forming lens. The light beam is then converged as a light spot on a scanned face 8 so that the scanned face 8 is optically scanned.

The deflected light beam is incident to the scanning image forming lens as a parallel light beam. In this case, the scanning image forming lens is an fθ lens and an equal scanning speed property of the scanning image forming lens is evaluated by fθ characteristics.

Each of the first and second lenses 6A and 7A is formed by a plastic material using injection molding. The plastic material has a refractive index 1.5721 with respect to the above oscillating wavelength 780 nm.

The scanning image forming lens constructed by the first lens 6A and the second lens 7A has a function for approximately setting the scanned face 8 and a starting point of deflection of the light beam on the deflecting reflecting face of the rotary polygon mirror 5 in a conjugate relation in geometrical optics with respect to the cross scan-corresponding direction. Accordingly, the scanning image forming lens has a function for correcting an inclination of the deflecting reflecting face.

The first lens 6A arranged on a side of the rotary polygon mirror 5 is constructed by a positive meniscus lens having a concave face directed onto an incident side. At least one face of the first lens 6A is constructed by an aspherical surface. The second lens 7A is arranged in the vicinity of a scanned face side of the first lens 6A. An incident face side of the second lens 7A is constructed by a barrel type toroidal face having an aspherical shape in the main scan-corresponding direction. A scanned face side of the second lens 7A is constructed by a normal toroidal face. $\theta_1$ is set to an acute angle formed between a light beam incident to the second lens and the optical axis. $\theta_2$ is set to an acute angle formed between a light beam emitted from the second lens and the optical axis. $|\theta_1/\theta_2|$ is changed in the shape of a monotonous concave curve having a local minimum in the vicinity of the optical axis.

In the following description, a Z-coordinate is set to an optical axis direction and h is set to a distance measured from the optical axis in the main scan-corresponding direction. $R_m$ is set to a radius of curvature of the barrel type toroidal face with respect to the main scan-corresponding direction. Further, k is set to a conical constant and a, b, c and d are set to aspherical coefficients of higher orders. In this case, the barrel type toroidal face having an aspherical shape in the main scan-corresponding direction is a curved surface obtained by rotating a curve represented by the following formula around an axis which is parallel to the main scanning direction and is separated by $R_s$ on the optical axis from an origin of this curve.

$$Z=(1/R_m)\ h^2/[1+\sqrt{\{1-(1+K)\ (h/R_m)^2\}}+a\cdot h^4+b\cdot h^6+c\cdot h^8+d\cdot h^{10}$$

The barrel type toroidal face is specified by $R_m$, $R_s$, k, a, b, c and d.

Similar to the concrete examples 1 and 2 explained with reference to FIGS. 1a to 1e, $S_0$ is set to a distance between a starting point of deflection on the rotary polygon mirror 5 and an incident side face of the first lens 6A. $d_1$ is set to a thickness of the first lens 6A on the optical axis. $l_1$ is set to a clearance on the optical axis between an emitting side face of the first lens 6A and an incident side face of the second lens 7A. $d_2$ is set to a thickness of the second lens 7A on the optical axis. $l_2$ is set to a clearance on the optical axis between an emitting side face of the second lens and the scanned face 8. $R_1$ is set to a radius of curvature of the incident side face of the first lens 6A. $R_2$ is set to a radius of curvature of the emitting side face of the first lens 6A on the optical axis.

$Rm_3$ is set to a radius of curvature of the incident side face of the second lens 7A on the optical axis in the main scan-corresponding direction. $Rs_3$ is set to a radius of curvature of the incident side face of the second lens 7A on the optical axis in the cross scan-corresponding direction. $Rm_4$ is set to a radius of curvature of the emitting side face of the second lens 7A in the main scan-corresponding direction. $Rs_4$ is set to a radius of curvature of the emitting side face of the second lens 7A in the cross scan-corresponding direction.

Concrete example 3

```
S_0 = 44.2
R_1 = -478                      d_1 = 20
R_2 = -69.5                     l_1 = 41.1
Rm_3 = -630, Rs_3 = -34.82      d_2 = 4.2
Rm_4 = -700, Rs_4 = -18.16      l_2 = 99.3
```

Numeric values of k, a, b, c and d with respect to the aspherical surface are provided as follows.

Emitting side face of the first lens 6A:

$K=-0.551$, $A=5.277\times10^{-8}$, $B=-1.533\times10^{-12}$, $C=-4.06\times10^{-15}$, $D=-1.05\times10^{-18}$ Incident side face of the second lens 7A:

$k=15$, $a=1.81\times10^{-7}$, $b=-1.58\times10^{-11}$, $c=1.069\times10^{-15}$, $d=-5.44\times10^{-20}$ In this concrete example 3, lens data with respect to the main scan-corresponding direction are equal to those in the concrete example 1 explained above. Accordingly, similar to FIG. 1b, $|\theta_1/\theta_2|$ with respect to acute angles $\theta_1$ and $\theta_2$ shown in FIG. 3a is changed in the shape of a monotonous concave curve having a local minimum in the vicinity of the optical axis. Further, fθ characteristics are equal to those in FIG. 1e.

In this concrete example 3, the second lens 7A is anamorphic. Accordingly, as shown in FIG. 3b, field curvature is also extremely preferably corrected with respect to a cross scanning direction in addition to a main scanning direction.

Concrete example 4

```
S_0 = 44.9
R_1 = -422.5                    d_1 = 19.1
R_2 = -68.15                    l_1 = 75
Rm_3 = -400, Rs_3 = -39.5       d_2 = 5
Rm_4 = -500, Rs_4 = -17         l_2 = 66
```

Numeric values of k, a, b, c and d with respect to the aspherical surface are provided as follows.

Figure 4A:
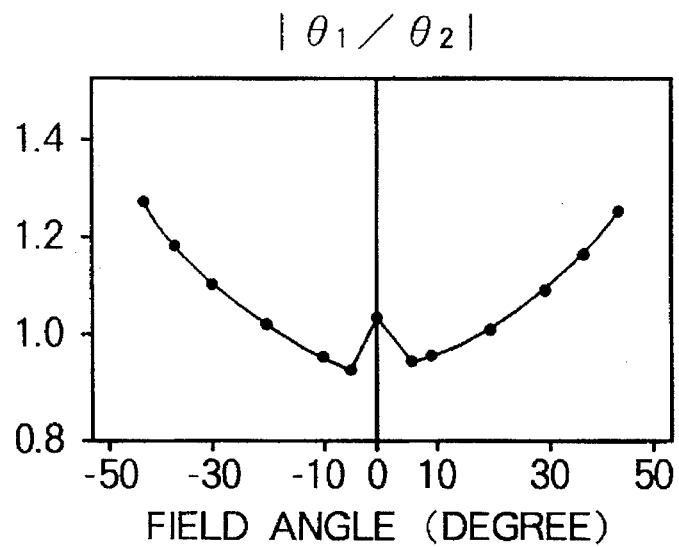
FIGS. 4a to 4c are views for explaining a concrete example 4.
Figure 4B:
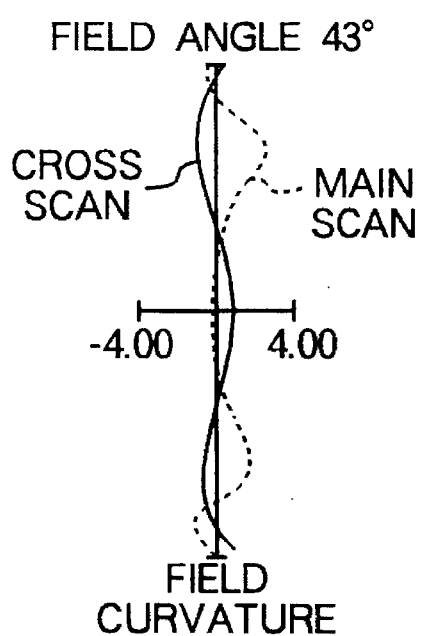
Figure 4C:
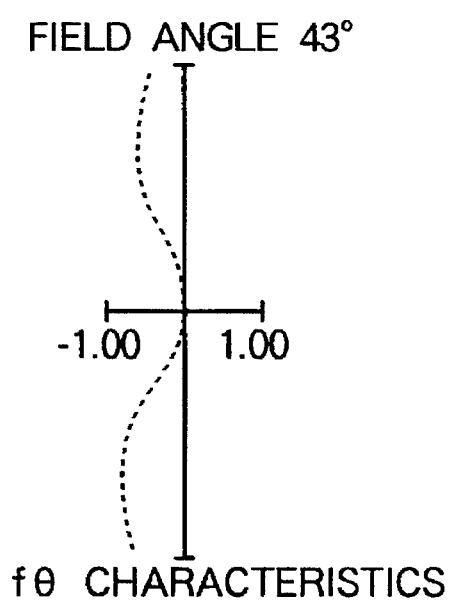

Emitting side face of the first lens 6A:

$K=11.05$, $A=-3.89\times10^{-7}$, $B=1.4\times10^{-10}$, $C=-2.4\times10^{-14}$, $D=-2.0\times10^{-19}$ Incident side face of the second lens 7A:

$k=13.59$, $a=2.19\times10^{-7}$, $b=-2.066\times10^{-11}$, $c=1.721\times10^{-15}$, $d=-3.5\times10^{-20}$ As shown in FIG. 4a, $|\theta_1/\theta_2|$ is changed in the shape of a monotonous concave curve having a local minimum in the vicinity of the optical axis. Further, fθ characteristics are preferably corrected as shown in FIG. 4c and field curvature is preferable in both the main and cross scanning directions as shown in FIG. 4b.

Magnification in the conjugate relation in the cross scan-corresponding direction is set to m(O) on the optical axis and m(H) at the height of a most peripheral image. At this time, m(O) is equal to 1.1 in the concrete example 3 and is equal to 0.599 in the concrete example 4. In the concrete example 4, since M(O) is 0.599 close to a lower limit in the condition (2), the clearance $l_1$ between the first and second lenses is a slightly large value of 75. Accordingly, when M(O) exceeds the lower limit in the condition (2), effects of compactness of the scanning image forming lens are reduced.

Parameter m(H)/m(O) in the condition (1) is equal to 0.954 in the concrete example 3 and is equal to 1.038 in the concrete example 4. Accordingly, the condition (1) is satisfied with respect to this parameter in each of the concrete examples 3 and 4.

In each of the concrete examples 3 and 4, the diameter of a light spot is set to a value close to 70 μm with respect to the cross scanning direction. Spot diameters in the cross scanning direction at field angle ±43 degrees (image height ±105) and field angle 0 (image height 0) are provided as follows in each of the concrete examples 3 and 4.

| field angle | 43° | 0° | −43° |
| --- | --- | --- | --- |
| concrete example 3 | 69.1 μm | 72.7 μm | 68.7 μm |
| concrete example 4 | 72.0 μm | 69.2 μm | 72.1 μm |

In the concrete example 3, the spot diameter in the cross scanning direction at the height of a peripheral image is smaller by 5% than that at the height of a central image. In the concrete example 4, the spot diameter in the cross scanning direction at the height of a peripheral image is greater by 3.8% than that at the height of a central image. In both the concrete examples 3 and 4, the spot diameter has a correlation with a lateral magnification in the cross scan-corresponding direction. Namely, the requirement of "a variation of the spot diameter is within 5%" for an optical scanning operation with high dot density of 600 dpi or more is satisfied.

In each of the concrete examples 1 to 4, a variation of the image forming position in the main scanning direction caused by a change in temperature is preferably reduced.

In each of the concrete examples 1 to 4, the second lens is uniformly formed. Accordingly, the second lens can be easily manufactured by injection molding such that a shape of the second lens accurately corresponds to the shape of a die.

As explained above, a novel scanning image forming lens having each of first to fourth constructions and a novel optical scanner having each of fifth to seventh constructions can be provided in accordance with the present invention.

The scanning image forming lens having each of the first to fourth constructions of the present invention is constructed as mentioned above. Accordingly, the scanning image forming lens can be manufactured cheaply and precisely by using plastic and can be made compact. Further, the scanning image forming lens is stably operated irrespective of a change in temperature. Accordingly, it is possible to realize preferable optical performance such as fθ characteristics, etc. required for the scanning image forming lens.

The optical scanner having each of the fifth to seventh constructions of the present invention is constructed as mentioned above. Accordingly, the optical scanner can be cheaply manufactured and can be made compact. Further, the optical scanning operation can be preferably performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A scanning image forming lens used in an optical scanner in which a light beam from a laser light source is coupled and deflected at an equal angular velocity by an optical deflector and is converged as a light spot on a scanned face by the scanning image forming lens to optically scan the scanned face at an equal speed;

the scanning image forming lens being constructed by two plastic lenses composed of first and second lenses such that the first lens is arranged on a side of the optical deflector and is constructed by a positive meniscus lens having a concave face directed towards an optical deflector side;

the second lens is arranged in the vicinity of a scanned face side of said first lens;

at least one face of each of the first and second lenses is constructed by an aspherical surface; and $|\theta_1/\theta_2|$ has two minimal values in the vicinity of an optical axis of the scanning image forming lens and is increased from said minimal values toward a peripheral portion of the scanning image forming lens when $\theta_1$ is set to an acute angle formed between the optical axis and the light beam incident to the second lens and $\theta_2$ is set to an acute angle formed between the optical axis and the light beam emitted from the second lens.

2. An optical scanner in which a light beam from a laser light source is coupled and deflected at an equal angular velocity by an optical deflector and is converged as a light spot on a scanned face by the scanning image forming lens to optically scan the scanned face at an equal speed;

the scanning image forming lens being constructed by two plastic lenses composed of first and second lenses such that the first lens is arranged on a side of the optical deflector and is constructed by a positive meniscus lens having a concave face directed towards an optical deflector side;

the second lens is arranged in the vicinity of a scanned face side of said first lens;

at least one face of each of the first and second lenses is constructed by an aspherical surface; and $|\theta_1/\theta_2|$ has two minimal values in the vicinity of an optical axis of the scanning image forming lens and is increased from said minimal values toward a peripheral portion of the scanning image forming lens when $\theta_1$ is set to an acute angle formed between the optical axis and the light beam incident to the second lens and $\theta_2$ is set to an acute angle formed between the optical axis and the light beam emitted from the second lens.

3. An optical scanner as claimed in claim 2, wherein the light beam from the laser light source is changed to a parallel light beam by a coupling lens.

* * * * *